(12) United States Patent
Rowlan

(10) Patent No.: US 9,869,745 B1
(45) Date of Patent: Jan. 16, 2018

(54) SYSTEMS AND METHODS FOR IMPROVING BEARING RECEPTION ON A TCAS OR OTHER SURVEILLANCE SYSTEM

(71) Applicant: Stacey R. Rowlan, Phoenix, AZ (US)

(72) Inventor: Stacey R. Rowlan, Phoenix, AZ (US)

(73) Assignee: Aviation Communications & Surveillance Systems, LLC, Phoenix, AZ (US)

( * ) Notice: Subject to any disclaimer, the term of this patent is extended or adjusted under 35 U.S.C. 154(b) by 906 days.

(21) Appl. No.: 14/104,733

(22) Filed: Dec. 12, 2013

Related U.S. Application Data

(60) Provisional application No. 61/736,240, filed on Dec. 12, 2012.

(51) Int. Cl.
*G01S 19/01* (2010.01)
*G01S 3/02* (2006.01)
*G01S 1/02* (2010.01)

(52) U.S. Cl.
CPC ............... *G01S 1/02* (2013.01); *G01S 19/01* (2013.01)

(58) Field of Classification Search
CPC .................. G01S 13/93; G01S 13/9303
USPC .......... 342/29, 32, 37, 357.39, 455; 701/301
See application file for complete search history.

(56) References Cited

U.S. PATENT DOCUMENTS

| | | | |
|---|---|---|---|
| 5,280,285 A * | 1/1994 | Curtis | G01S 13/781 342/32 |
| 6,222,480 B1 * | 4/2001 | Kuntman | G01S 13/767 342/30 |
| 2005/0156777 A1 * | 7/2005 | King | G01S 3/023 342/29 |

* cited by examiner

*Primary Examiner* — Dao Phan
(74) *Attorney, Agent, or Firm* — Squire Patton Boggs

(57) ABSTRACT

Various avionics systems may be enhanced by methods and systems for bearing reception. For example, a traffic alert and collision avoidance system, or other surveillance system, can be provided with a system or configured for a method of improved bearing reception. For example, a method can include performing traffic alert and collision avoidance surveillance of a target aircraft using an interrogation over a bottom antenna of an own aircraft. The method can also include enhancing determination of a bearing of the surveillance by obtaining a bearing of the target aircraft using an alternative to making a bearing determination based on signal characteristics of a reply to the interrogation.

12 Claims, 8 Drawing Sheets

SYSTEMS AND METHODS FOR IMPROVING BEARING RECEPTION ON A TCAS OR OTHER SURVEILLANCE SYSTEM

CROSS REFERENCE TO RELATED APPLICATIONS

The present application is related to and claims the benefit and priority of U.S. Provisional Patent Application No. 61/736,240, filed Dec. 12, 2012, the entirety of which is hereby incorporated herein by reference.

BACKGROUND

Field

Various avionics systems may be enhanced by methods and systems for bearing reception. For example, a traffic alert and collision avoidance system, or other surveillance system, can be provided with a system or configured for a method of improved bearing reception.

Description of the Related Art

Traffic alert and Collision Avoidance (TCAS) systems can utilize a directional antenna to obtain bearing information for tracked aircraft. The directional antenna conventionally is made up of four elements that simultaneously receive signal data from the tracked aircraft. This data is used to determine the relative angle, or bearing, at which the signal was received. The bearing can be determined by doing power or phase comparisons of the signal received on each of the four elements.

The TCAS, in a conventional system, periodically interrogates other aircraft and listens for a reply to its interrogation. Reception of this reply is the source of the bearing data.

In order to reduce installation, maintenance and operating costs, only a single directional antenna is conventionally installed on the top of the aircraft. The bottom antenna is an omni-directional antenna. While capable of providing reliable track data, the omni-directional antenna is not capable of providing bearing information.

There are instances when bearing information may be desired but not obtainable with a bottom omni-directional antenna. These include scenarios where the intruder aircraft is at close range and below own aircraft. A similar issue exists with a bottom directional antenna when bearing is not available due to obstruction of the signal path due to landing gear being extended.

Sometimes the reason the intruder aircraft transitions to being tracked on the bottom antenna is not because its replies cannot be heard on the top antenna but rather because the TCAS on own aircraft reduces the interrogation power, such that the transponder on the intruder aircraft no longer detects the interrogations. This reduction in power is known as power programming and conventionally is a required feature of commercial TCAS systems in order to reduce unnecessary interference between systems.

As a result of operation in the power programming mode, the tracking interrogations are transmitted from the bottom antenna which has a more direct path to the intruder aircraft antenna but when installed with an omni-directional antenna bearing will be lost.

SUMMARY

According to certain embodiments of the present invention, a method can include performing traffic alert and collision avoidance surveillance of a target aircraft using an interrogation over a bottom antenna of own aircraft. The method can also include enhancing determination of a bearing of the surveillance by obtaining a bearing of the target aircraft using an alternative to making a bearing determination based on signal characteristics of a reply to the interrogation.

In certain embodiments of the present invention, a method can include performing traffic alert and collision avoidance surveillance of a target aircraft using an interrogation over a bottom antenna of own aircraft. The method can also include listening for a reply to the interrogation on a top antenna.

A method, according to certain embodiments of the present invention, can include determining that a target aircraft is closer than a predetermined threshold distance. The method can also include performing traffic alert and collision avoidance surveillance of the target aircraft using an interrogation over a top antenna while reducing or eliminating power programming requirements, based on having determined that the target aircraft is closer than the predetermined threshold distance.

An apparatus, in certain embodiments of the present invention, can include at least one processor and at least one memory including computer program code. The at least one memory and the computer program code can be configured to, with the at least one processor, cause the apparatus at least to perform traffic alert and collision avoidance surveillance of a target aircraft using an interrogation over a bottom antenna of own aircraft. The at least one memory and the computer program code can also be configured to, with the at least one processor, cause the apparatus to enhance determination of a bearing of the surveillance by obtaining a bearing of the target aircraft using an alternative to making a bearing determination based on signal characteristics of a reply to the interrogation.

According to certain embodiments of the present invention, an apparatus can include at least one processor and at least one memory including computer program code. The at least one memory and the computer program code can be configured to, with the at least one processor, cause the apparatus at least to perform traffic alert and collision avoidance surveillance of a target aircraft using an interrogation over a bottom antenna of own aircraft. The at least one memory and the computer program code can also be configured to, with the at least one processor, cause the apparatus to listen for a reply to the interrogation on a top antenna.

In certain embodiments of the present invention, an apparatus can include at least one processor and at least one memory including computer program code. The at least one memory and the computer program code can be configured to, with the at least one processor, cause the apparatus at least to determine that a target aircraft is closer than a predetermined threshold distance. The at least one memory and the computer program code can also be configured to, with the at least one processor, cause the apparatus to perform traffic alert and collision avoidance surveillance of the target aircraft using an interrogation over a top antenna while reducing or eliminating power programming requirements, based on having determined that the target aircraft is closer than the predetermined threshold distance.

BRIEF DESCRIPTION OF THE DRAWINGS

For proper understanding of the invention, reference should be made to the accompanying drawings, wherein.

DETAILED DESCRIPTION

As mentioned above, there are instances when bearing information is desired but not obtainable with a bottom omni-directional antenna. Certain embodiments of the present invention may address this and other issues and may provide further methods and systems that may be applied in a variety of ways.

Figure 1:
FIG. 1 illustrates TCAS operation at a distant range.

The aircraft geometries associated with this issue can be seen in the figures. Moreover, these figures illustrate how the interrogations/replies can limit the bearing reception, under certain conditions. For example, FIG. 1 illustrates TCAS operation at a distant range. As shown in FIG. 1, own aircraft 110 can interrogate a distant target aircraft 120. At a distant range, TCAS interrogations are high power and the transmission path from the top antenna is not significantly obstructed. Meanwhile, Mode S transmissions are always at full power.

Although FIG. 1 and the other figures herein depict an airplane, other aircraft may employ systems and methods of the present invention. Thus, for example, certain other aircraft can include helicopters, space ships, quadracopters, unmanned aerial vehicles, dirigibles, and so on. In short, any aircraft can be equipped with any embodiment of the present invention.

Figure 2:
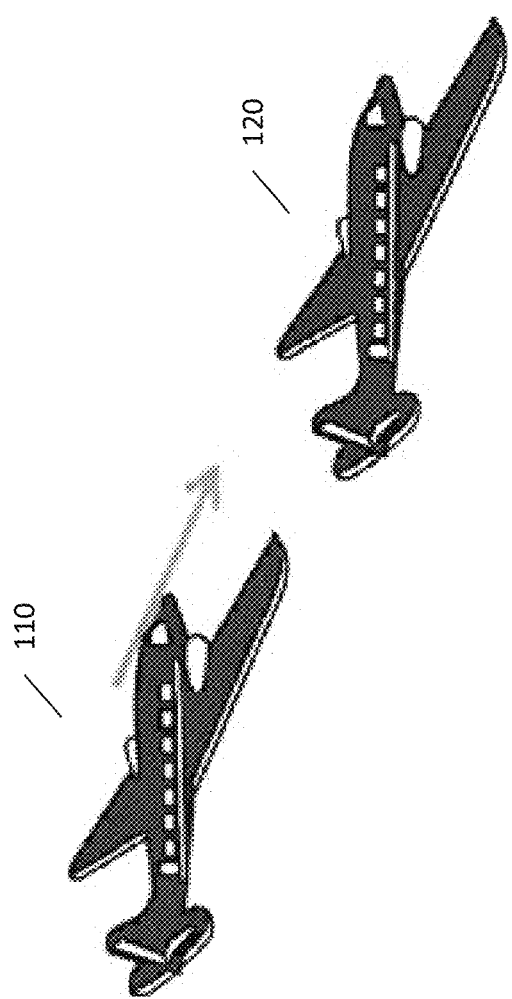
FIG. 2 illustrates TCAS interrogation at a short range.

FIG. 2 illustrates TCAS interrogation at short range. As shown in FIG. 2, as range decreases the interrogation power may decrease. This may be the result of the TCAS system in own aircraft 110 implementing Power Programming, as mentioned above. Thus, by way of example, at 1 nmi the power may be decreased by 20 db, resulting in difficulty in the target aircraft 120 properly receiving the interrogation. In addition, the transmission path from the top antenna may be obstructed by the fuselage of own aircraft 110. The transponder in the target aircraft 120 may not reply because it may not detect the interrogation.

Figure 3:
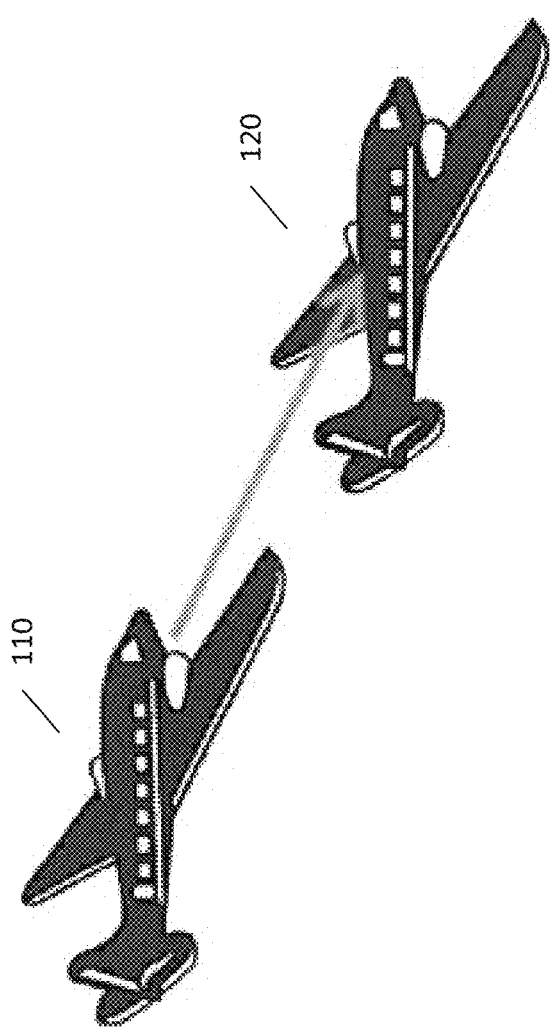
FIG. 3 illustrates TCAS interrogation over a bottom antenna.

FIG. 3 illustrates TCAS interrogation over a bottom antenna. When interrogations from the top antenna are unsuccessful, own aircraft 110 can transmit the interrogations from the bottom antenna. In this way, the interrogations can reach the target aircraft 120.

Figure 4:
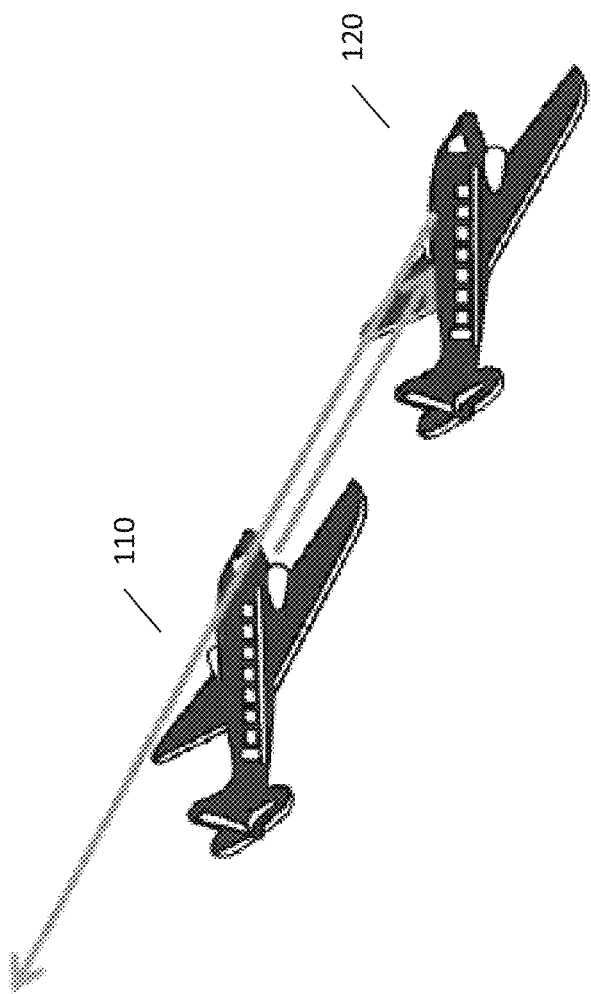
FIG. 4 illustrates transponder replies and/or squitters.

FIG. 4 illustrates transponder replies and/or squitters. Regardless of the power of own aircraft 110 interrogations, transponder replies and squitters from the target aircraft 120 may be transmitted at full power. Thus, these signals may still be received on the top TCAS antenna, even at close ranges.

Figure 5:
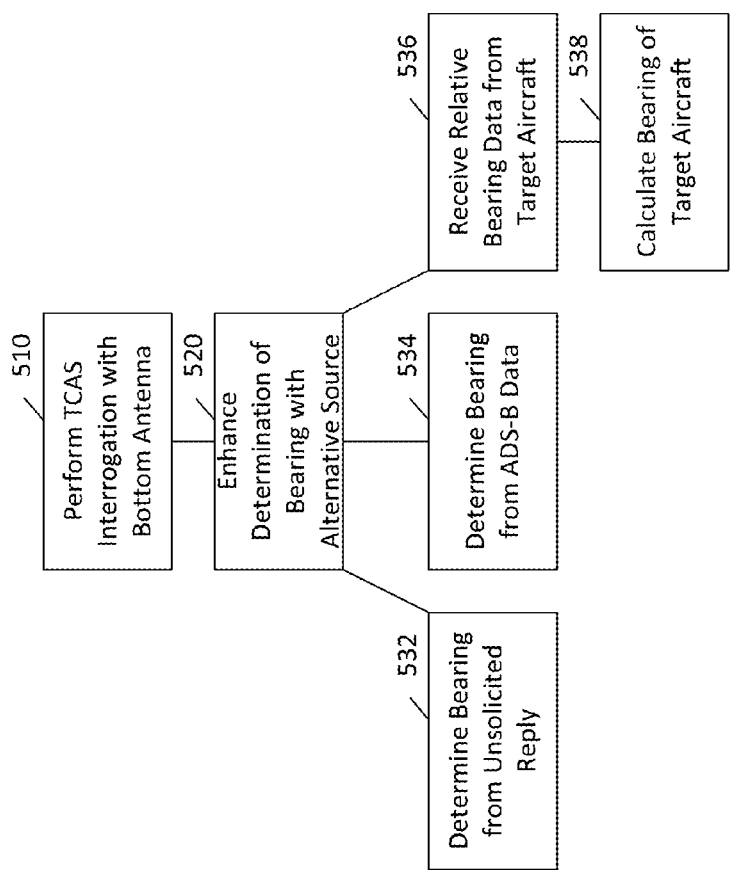
FIG. 5 illustrates a method according to certain embodiments consistent with the present invention.

FIG. 5 illustrates a method according to certain embodiments of the present invention. As shown in FIG. 5, a method can include, at 510, performing traffic alert and collision avoidance surveillance of a target aircraft using an interrogation over a bottom antenna of own aircraft. This situation may arise in the scenarios illustrated in FIGS. 2-4. Traffic alert and collision avoidance surveillance is one example of surveillance, in accordance with certain embodiments of the present invention. Any other kind of surveillance may also be employed by systems and methods consistent with embodiments of the present invention.

The method can also include, at 520, enhancing determination of a bearing of the surveillance by obtaining a bearing of the target aircraft using an alternative to making a bearing determination based on signal characteristics of a reply to the interrogation. In other words, rather than relying solely on the bottom antenna, a bearing determination can be made using information acquired in another way. Several examples are provided for ways to enhance the bearing determination, but any other ways are also permitted and may be employed by systems and methods consistent with embodiments of the present invention.

Thus, a way to maintain the bearing track on an intruder aircraft is to use bearing information from another source to update the track data when tracking interrogations are transmitted on the bottom omni-directional antenna. For example, the method can include, at 532, determining the bearing from an unsolicited reply from the target aircraft. The unsolicited reply can include at least one of a DF-11 squitter, a DF=0/4 FRUIT message, a DF=17 extended squitter message or any other similar transmission.

Bearing information may be available from received unsolicited replies transmitted from the intruder aircraft. Since the transponder may always transmit these messages at full power, they may be received on the top directional antenna even when tracking interrogations have been transitioned to the bottom antenna.

The method can also, or alternatively, include, at 534, determining the bearing from automatic dependent surveillance-broadcast (ADS-B) data. For example, the automatic dependent surveillance-broadcast data may comprise at least one of a global positioning system position or a relative bearing for the target aircraft. The bearing can be indicated in any other way as well, using a data link over ADS-B.

Another alternative is to use a networked communication of bearing information. This can be accomplished, for example, by having an intruder aircraft, for example the target aircraft, transmit relative bearing information to own aircraft. Thus, for example, the method can include, at 536, receiving relative bearing information from the target aircraft. This relative bearing information can be received directly from the target aircraft or through a network that may include one or more satellites and/or one or more ground stations.

Own aircraft could then calculate relative bearing to the intruder aircraft using that information. Thus, the method may include, at 538, calculating a bearing of the target aircraft based on the received relative bearing information.

Figure 6:
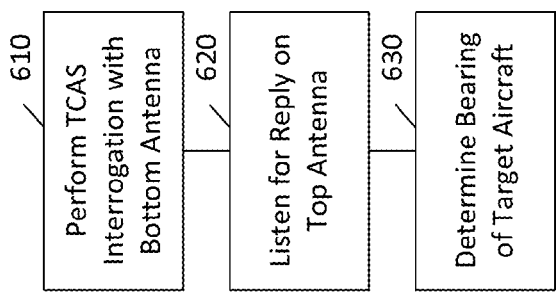
FIG. 6 illustrates another method according to certain embodiments consistent with the present invention.

FIG. 6 illustrates another method according to certain embodiments of the present invention. The method can include, at 610, performing traffic alert and collision avoidance surveillance of a target aircraft using an interrogation over a bottom antenna of own aircraft. The method can also include, at 620, listening for a reply to the interrogation on a top antenna. The method can further include, at 630, determining bearing of the target aircraft.

Thus, another method of enhancing the bearing can be to periodically listen for replies on the top directional antenna even when the tracking interrogation was transmitted on the bottom antenna. The top antenna can include multiple directional elements, as described above. Moreover, the listening can be performed periodically, both when the bottom antenna is being used for interrogations and when the top antenna is being used for interrogations.

Figure 7:
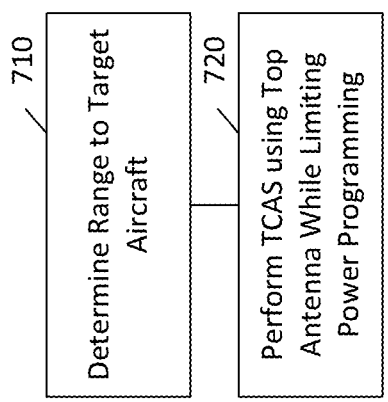
FIG. 7 illustrates a further method according to certain embodiments consistent with the present invention.

FIG. 7 illustrates a further method according to certain embodiments of the present invention. The method can include, at 710, determining that a target aircraft is closer than a predetermined threshold distance. The predetermined threshold distance can be approximately two nautical miles or any other desired threshold distance. For example, the predetermined threshold distance can be set between about one nautical mile and three nautical miles. Other threshold distances can be utilized. The power programming can be employed while the target aircraft is at a distance greater than the threshold distance. In certain embodiments of the present invention, an altitude threshold can also (or alternatively) be employed, and power programming can be limited or disabled when own aircraft has a higher altitude than the intruder or target aircraft. Similarly, a bearing threshold can be employed so that the power programming is limited or disabled when a bearing to the target aircraft is, or is predicted to be, in an area where blockage due to own aircraft fuselage or other feature may occur.

The method can also include, at 720, performing traffic alert and collision avoidance surveillance of a target aircraft using an interrogation over a top antenna while reducing or eliminating power programming requirements, based on having determined that the target aircraft is closer than a predetermined threshold distance.

Thus, one way to enhance bearing reception is to increase the interrogation power from the top antenna by reducing or eliminating the power programming requirements at very close ranges, such as less than two nautical miles, although any other distance threshold may be employed. This may increase the probability of the intruder aircraft's reception of the interrogation and allow continued tracking on the top directional antenna.

Figure 8:
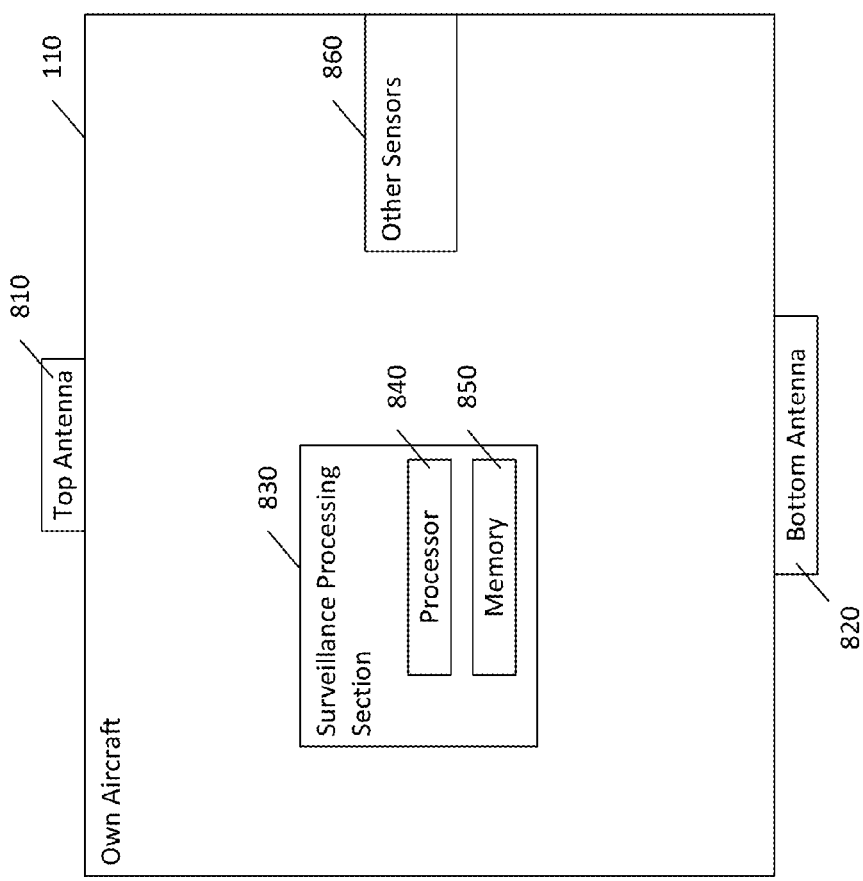
FIG. 8 illustrates a system according to certain embodiments consistent with the present invention.

FIG. 8 illustrates a system according to certain embodiments of the present invention. The system can include own aircraft 110, having a top antenna 810 and a bottom antenna 820. The top antenna 810 and the bottom antenna 820 can be TCAS antennas. Thus, for example, the top antenna 810 can be a directional antenna and the bottom antenna 820 can be an omnidirectional antenna.

The system can include a surveillance processing section 830, which can include at least one processor 840 and at least one memory 850. The surveillance processing section 830 can be operationally connected to the top antenna 810, the bottom antenna 820, and other sensors 860. The other sensors 860 can include sensors that are able to determine the location or bearing of a target aircraft, such as an intruder aircraft. The other sensors 860 can also include communication systems that are able to communicate data regarding the location or bearing of the target aircraft.

One having ordinary skill in the art will readily understand that the invention, as discussed above, may be practiced with steps in a different order, and/or with hardware elements in configurations which are different than those which are disclosed. Therefore, although the invention has been described based upon the disclosed embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
    performing traffic alert and collision avoidance surveillance of a target aircraft using an interrogation over a bottom antenna of own aircraft; and
    enhancing determination of a bearing of the surveillance by obtaining a bearing of the target aircraft using an alternative to making a bearing determination based on signal characteristics of a reply to the interrogation.

2. The method of claim 1, wherein the alternative comprises determining the bearing from an unsolicited reply from the target aircraft.

3. The method of claim 2, wherein the unsolicited reply comprises at least one of a DF-11 squitter, a DF=0/4 FRUIT message, or a DF=17 extended squitter message.

4. The method of claim 1, wherein the alternative comprises determining the bearing from automatic dependent surveillance-broadcast data.

5. The method of claim 4, wherein the automatic dependent surveillance-broadcast data comprises at least one of a global positioning system position or a relative bearing for the target aircraft.

6. The method of claim 1, wherein the alternative comprises receiving relative bearing information from the target aircraft.

7. The method of claim 6, further comprising:
    calculating a bearing of the target aircraft based on the received relative bearing information.

8. An apparatus, comprising:
    at least one processor; and
    at least one memory including computer program code;
    wherein the at least one memory and the computer program code are configured to, with the at least one processor, cause the apparatus at least to:
    perform traffic alert and collision avoidance surveillance of a target aircraft using an interrogation over a bottom antenna of own aircraft; and
    enhance determination of a bearing of the surveillance by obtaining a bearing of the target aircraft using an alternative to making a bearing determination based on signal characteristics of a reply to the interrogation.

9. The apparatus of claim 8, wherein the alternative comprises determining the bearing from an unsolicited reply from the target aircraft.

10. The apparatus of claim 8, wherein the alternative comprises determining the bearing from automatic dependent surveillance-broadcast data.

11. The apparatus of claim 8, wherein the alternative comprises receiving relative bearing information from the target aircraft.

12. The apparatus of claim 11, further comprising:
    calculating a bearing of the target aircraft based on the received relative bearing information.

* * * * *